United States Patent
Ustimchik et al.

(10) Patent No.: US 10,511,437 B1
(45) Date of Patent: Dec. 17, 2019

(54) FAST POLARIZATION ENCODING USING ELECTROOPTICAL PHASE MODULATOR

(71) Applicant: International Center for Quantum Optics & Quantum Technologies LLC, Skolkovo (RU)

(72) Inventors: Vasily Yevgenyevich Ustimchik, Moscow (RU); Alexander Valerievich Duplinsky, Moscow (RU); Yury Vladimirovich Kurochkin, Moscow (RU); Vladimir Leonidovich Kurochkin, Moscow (RU); Alan Alexandrovich Kanapin, Moscow (RU)

(73) Assignee: International Center for Quantum Optics & Quantum Technologies LLC, Skolkovo (RU)

( * ) Notice: Subject to any disclaimer, the term of this patent is extended or adjusted under 35 U.S.C. 154(b) by 89 days.

(21) Appl. No.: 15/725,701

(22) Filed: Oct. 5, 2017

(51) Int. Cl.
| | | |
|---|---|---|
| H04L 9/08 | (2006.01) | |
| H04B 10/70 | (2013.01) | |
| H04B 10/50 | (2013.01) | |
| H04K 1/00 | (2006.01) | |
| H04B 10/60 | (2013.01) | |
| H04K 1/08 | (2006.01) | |

(52) U.S. Cl.
CPC ......... *H04L 9/0858* (2013.01); *H04B 10/501* (2013.01); *H04B 10/60* (2013.01); *H04B 10/70* (2013.01); *H04K 1/006* (2013.01); *H04K 1/08* (2013.01)

(58) Field of Classification Search
CPC ........ H04L 9/0858; H04K 1/08; H04K 1/006; H04B 10/60; H04B 10/501; H04B 10/70
See application file for complete search history.

(56) References Cited

U.S. PATENT DOCUMENTS

| | | | |
|---|---|---|---|
| 7,333,611 B1 * | 2/2008 | Yuen | H04B 10/70 380/256 |
| 2005/0047601 A1 * | 3/2005 | Shields | H04B 10/70 380/283 |
| 2006/0280509 A1 * | 12/2006 | Tomaru | H04L 9/0662 398/188 |
| 2008/0013738 A1 * | 1/2008 | Tajima | H04L 9/0852 380/278 |

(Continued)

*Primary Examiner* — Cheng-Feng Huang
(74) *Attorney, Agent, or Firm* — Bardmesser Law Group

(57) ABSTRACT

Quantum key distribution device includes a transmitter, including a light source, a first polarization controller, a phase modulator and an optical attenuator, all connected in series using a first optical fiber; a receiver, including a second polarization controller, a second phase modulator, a third polarization controller, a beamsplitter, and two single photon detectors, all connected in series using a second optical fiber; and a communication channel providing a light path from the transmitter to the receiver. The first and/or second optical fiber is a polarization maintaining fiber. The first and second phase modulators are actively controlled Pockels cell crystals, lithium niobate crystals or gallium arsenide crystals. The polarization controllers include a piezo-driven fiber compression device, a Pockels cell controller, a piezo-driven fiber twist device, or a non-linear optical crystal. The first and third polarization controllers use a λ/2 plate, or 45° fiber splice polarizer.

11 Claims, 5 Drawing Sheets

(56) References Cited

U.S. PATENT DOCUMENTS

| | | | |
|---|---|---|---|
| 2009/0268901 A1* | 10/2009 | Lodewyck | H04L 9/0852 380/41 |
| 2010/0158252 A1* | 6/2010 | Youn | H04B 10/70 380/256 |
| 2011/0150226 A1* | 6/2011 | Cho | H04B 10/70 380/278 |
| 2015/0016610 A1* | 1/2015 | Verma | H04L 9/0852 380/256 |
| 2015/0304051 A1* | 10/2015 | Yuan | H04B 10/70 398/188 |
| 2017/0019185 A1* | 1/2017 | Agarwal | H04B 10/70 |
| 2017/0104546 A1* | 4/2017 | Bitauld | H04B 10/70 |

* cited by examiner

FAST POLARIZATION ENCODING USING ELECTROOPTICAL PHASE MODULATOR

BACKGROUND OF THE INVENTION

Field of the Invention

The invention relates to optics, and, more particularly, to optical communication, including quantum communications and quantum key distribution.

Description of the Related Art

Various polarization encoding schemes are known in the art. For example, C. Kurtsiefer et al.,
"Long Distance Free Space Quantum Cryptography," Proc. SPIE 4917, 25 (2002), describe a technical solution for fast polarization coding is presented, in the optical scheme of which the polarization states are generated by means of 4 laser radiation sources. With this approach, a significant problem arises—the discernibility of laser pulses generated by various radiation sources. This fact is a significant vulnerability of the quantum key distribution system, built on this principle. A passive method using polarizing beam splitters is used to distinguish different polarization states on the side of the receiver in this optical scheme. This technical solution assumes the use of one single-photon detector to detect each polarization state (for example, 4 single-photon detectors for the BB84 protocol), which significantly increases the cost of the system, making it more vulnerable to attacks by unauthorized users, compared to the technical solution offered by the authors of this patent. The Advantage of this scheme is a higher key generation rate.

X. Liu, C. Liao, J. Mi, J. Wang, and S. Liu, "Intrinsically stable phase-modulated polarization encoding system for quantum key distribution," Phys. Lett. A 54, 373 (2008), and X. Liu et al., "Polarization coding and decoding by phase modulation in polarizing sagnac interferometers," Proc. SPIE 6827, 682701 (2007) describe a version of the optical scheme for quantum key distribution. This group of researchers has a number of articles with different variations of this scheme, but the principles essentially remain the same. The preparation of polarization states is carried out using a balanced interferometer. An electrooptical phase modulator based on lithium niobate is built in one of the arms of the interferometer, which makes it possible to create a controlled phase difference of the optical radiation propagating along different arms of the interferometer. At the output of the interferometer, light is combined by a polarization beam splitter. However, the use of an interferometer in the design of the scheme greatly complicates the working process, since it requires phase stabilization. Also, it is proposed to use interferometers based on free space optics elements in the papers of this group. This approach allows to increase the stability of the interferometer, but also increases the losses inside the receiver and transmitter devices.

M. Jofre et al., "100 MHz Amplitude and Polarization Modulated Optical Source for Free-Space Quantum Key Distribution at 850 nm," J. Lightwave Technol. 28(17), 2572-2578 (2010), and Lucio-Martinez, P. Chan, X. Mo, S. Hosier, and W. Tittel, "Proof-of-concept of real-world quantum key distribution with quantum frames," New J. Phys. 11, 095001 (2009) describe an approach of changing the optical polarization states using an electro-optical phase modulator based on lithium niobate. A characteristic feature of this scheme is the requirement for a unique design of phase modulators. The design assumes an exact orientation of the input polarization maintaining fiber at an angle of 45 degrees with respect to the axes of the lithium niobate crystal. The phase shift between two orthogonal polarization components (and, consequently, a change in the polarization state) occurs because the phase delay (the Pockels effect) manifests itself only along one of the axes of the phase modulator crystal. For this scheme, the critical issue is the significant influence of the polarization mode dispersion inside the crystals. In the papers of these groups, various solutions are proposed for compensating for this effect by adding to the scheme additional components—e.g., a compensating fiber, a Faraday mirror. This solution complicates the optical scheme and is not optimal.

Accordingly, there is a need in the art for a new optical scheme for fast changing of the polarization state of optical radiation to perform polarization encoding of information bits using a single laser radiation source.

SUMMARY OF THE INVENTION

The invention relates to an optical scheme that allows to change the polarization states of light (encode/decode information bits) with the help of electro-optical phase modulators, where the frequency of light modulation is limited only by the frequency band of the phase modulator, which can reach 40 GHz for commercially available phase modulators based on $LiNbO_3$, and which substantially obviates one or more disadvantages of the related art.

In one aspect, a quantum key distribution device includes a transmitter, including a light source, a first polarization controller, a phase modulator and an optical attenuator, all connected in series using a first optical fiber; a receiver, including a second polarization controller, a second phase modulator, a third polarization controller, a beamsplitter, and two single photon detectors, all connected in series using a second optical fiber; and a communication channel providing a light path from the transmitter to the receiver.

Optionally, the first optical fiber is a polarization maintaining fiber. Optionally, the second optical fiber is a polarization maintaining fiber. Optionally, the first and second phase modulators are actively controlled non-linear optical crystals. Optionally, the first and second phase modulators are Pockels cell optical crystals. Optionally, the first and second phase modulators are lithium niobate crystals or gallium arsenide crystals. Optionally, the first, second or third polarization controllers include any of a piezo-driven fiber compression device, a Pockels cell controller, a piezo-driven fiber twist device, and a non-linear optical crystal. Optionally, the first and third polarization controllers each uses a half-wave plate. Optionally, the first and third polarization controllers each uses a 45 degree fiber splice polarizer. Optionally, the beamsplitter in the receiver is a polarizing beamsplitter. Optionally, the attenuator is a variable optical attenuator.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 4A:
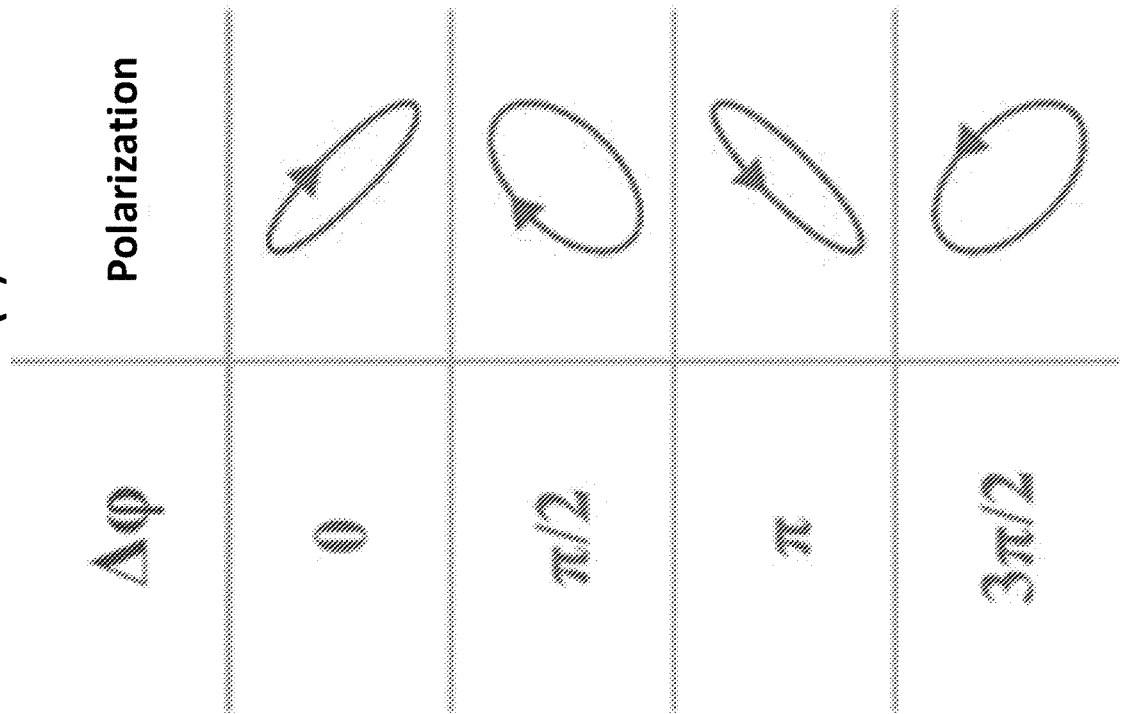
Figure 4B:
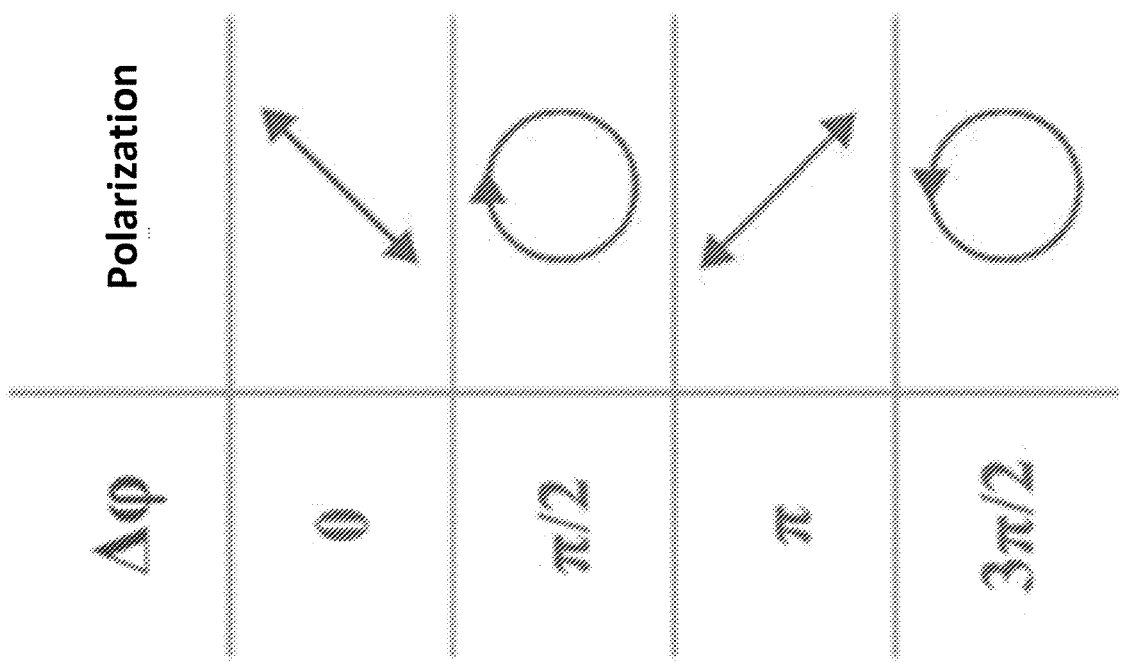

FIGS. 4(A), 4(B) illustrate transformation of the polarization state of light as a function of the phase shift applied by a phase modulator.

Figure 5:
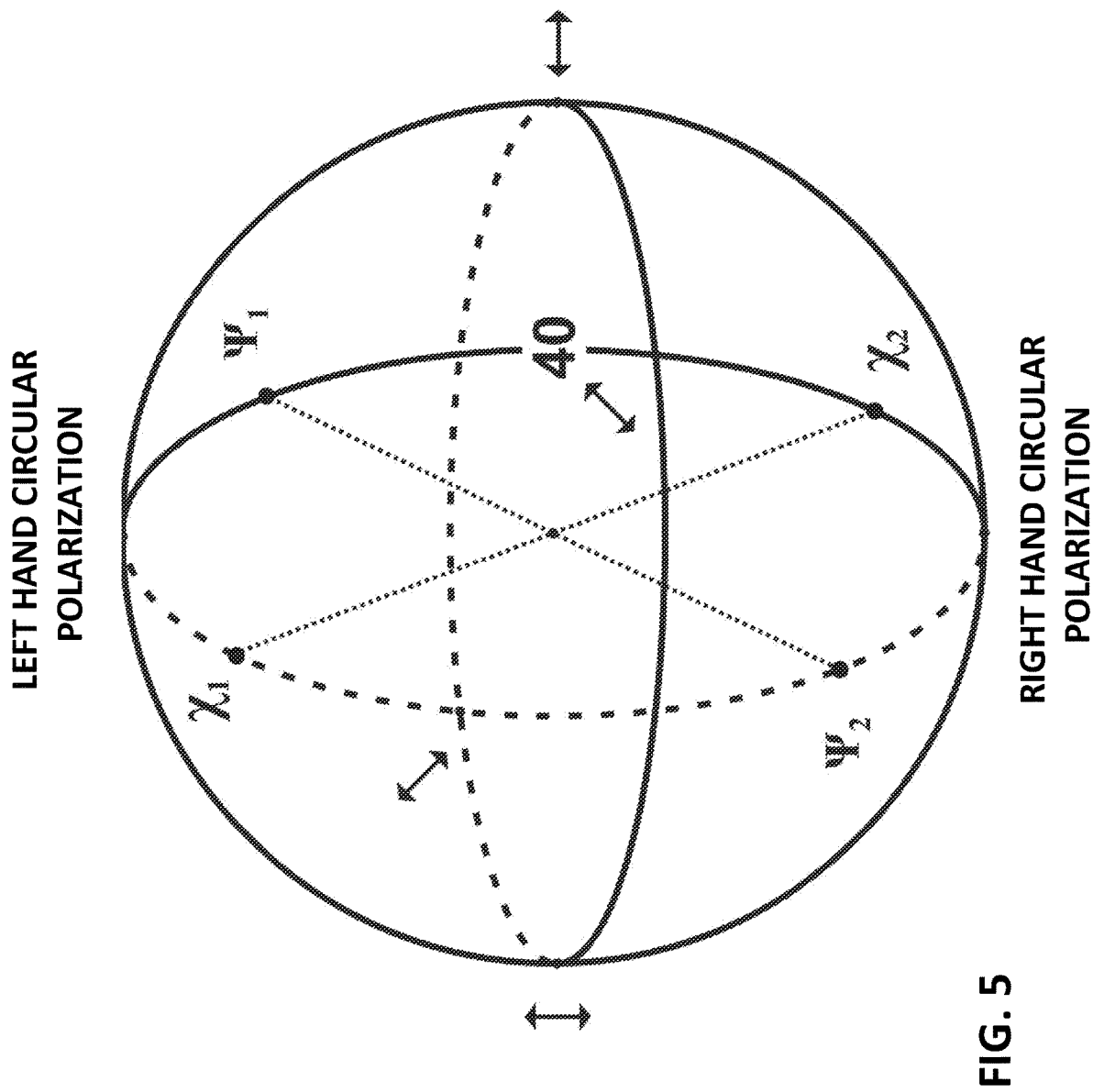

FIG. 5 illustrates a trajectory of the polarization state change marked on a Poincare sphere.

DETAILED DESCRIPTION OF THE PREFERRED EMBODIMENTS

Reference will now be made in detail to the preferred embodiments of the present invention, examples of which are illustrated in the accompanying drawings.

The invention relates to a new optical scheme for transmitting information bits using polarization coding, in particular for quantum key distribution (which is often used in quantum cryptography). The proposed optical scheme allows to encode bits in the arbitrary polarization states of light. The generation of different polarization states during coding takes place using an electro-optical phase modulator based on a $LiNbO_3$ crystal (or similar) and a single laser source. The use of a single laser radiation source solves the problem of distinguishing of the laser pulses, which arises when generating polarization states using several laser sources.

On the receiver side, polarization states are detected by means of two single-photon detectors using the technique of active basis choice. The basis is selected by means of selecting an electrical voltage applied to the electro-optical phase modulator on the receiver side. The option of phase modulators for the generation and detection of polarization states makes it possible to significantly increase the pulse repetition rate, which is limited by the radio frequency band of phase modulators and reduces the number of single-photon detectors.

The optical scheme consists of standard telecommunication components (a semiconductor narrowband laser at the telecommunication wavelength, electro-optical phase modulators based on $LiNbO_3$ crystals, standard polarization controllers) and is suitable for both fiber-optic and atmospheric communication channels. Such a technical solution allows to reduce losses (up to ~2 dB) in the receiver device, and accordingly increase both the key generation rate and transmission distance.

A new method for solving the problem of compensation of the polarization dispersion in a $LiNbO_3$ crystal is introduced. A special rotation of the polarization state at the input of the receiver allows two crystals (the phase modulator of the transmitter and receiver) to neutralize each other's effect.

Figure 1:
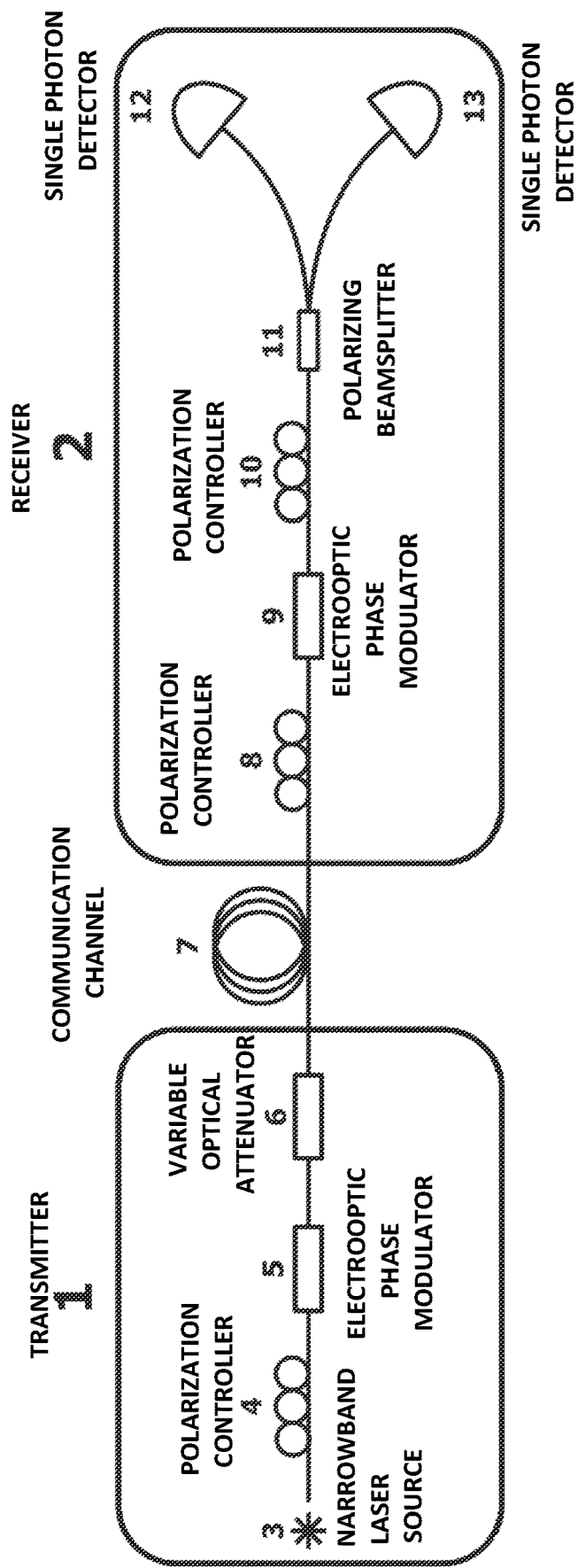
FIG. 1 illustrates an optical scheme of quantum key distribution using BB84 based on polarization encoding using polarization controllers.

The optical scheme shown in FIG. 1 is a linear fiber-optic circuit. It includes a transmitter and a receiver, connected by an optical fiber, which is a single-mode standard telecommunication optical fiber, or an atmospheric communication channel. The transmitter includes the following elements—a narrow-band laser radiation source at a telecommunication wavelength, a polarization controller (e.g., a piezo-driven fiber compression device, a Pockels cell controller, a piezo-driven fiber twist device, or a non-linear crystal), an electro-optical phase modulator based on lithium niobate or gallium arsenide crystals (or, more generally, an active phase modulator based on a non-linear crystal, for example, using the Pockels cell effect), a variable optical attenuator. The receiver consists of the following elements—a polarization controller, an electro-optical phase modulator based on lithium niobate, a polarization controller, a polarization beam splitter, two single-photon detectors. This scheme is based on elements with a standard single-mode telecommunication optical fiber.

FIG. 1 illustrates a first proposed optical scheme of quantum key distribution using BB84 based on polarization encoding by means of three polarization controllers. In FIG. 1, element 1 is a transmitter; element 2 is a receiver; element 3 is a narrowband laser; element 4 is a polarization controller; element 5 is a phase-shift modulator (electro-optic phase shifter); 6 is a variable optical attenuator; element 7 is a transmission line; element 8 is a polarization controller; element 9 is a phase-shift modulator (electro-optic phase shifter); element 10 is a polarization controller; element 11 is a polarizing beam splitter; elements 12, 13 are single-photon detectors.

The laser (element 3) emits linearly polarized optical pulses with wavelength 1550 nm. The polarization controller (element 4) converts the polarization state so that the projections of the field amplitude on the directions of the axes of the crystal of the phase modulator of the transmitter (element 5) are equal to each other. This allows the transmitter to encode information bits in the polarization states of light using a phase modulator.

The electric voltage applied to the phase-shift modulator (element 5) allows achieving a controlled phase shift between optical waves with linear polarization along the principal axes of the crystal, and in such way a change in the polarization state of the optical pulse. In order to attenuate the pulse to a level of single-photon state, a variable optical attenuator is used (element 6). The radiation intensity is reduced to the level of calibration or key generation level (with quantum key distribution) depending on the mode of operation. After the light passes through the quantum channel (element 7), the second polarization controller (element 8) compensates for the polarization change and achieves a polarization state such that the linear polarization components are directed along the axes of the lithium niobite crystal of the receiver (element 9), but rotated by 90 degrees relative to the polarization components at the input of the transmitter modulator (element 5). This procedure allows two lithium niobate crystals to compensate for each other's birefringence. The receiver modulator (element 9) is used to select the basis in which the measurements will be made. Finally, the polarization controller (element 10) converts the light polarization state so that it coincides with one of the polarizer beam splitter (element 11) axes for detecting states using single-photon detectors (12, 13). In this scheme it is possible to use single-mode standard telecommunication fiber in all elements.

The setup show in FIG. 1 has a light source (3) that generates linearly polarized laser pulses. The polarization controller (FIG. 1, element 4) is configured so that the amplitudes of the polarization components along the optical axes of the lithium niobate crystal in the phase modulator are equal. This makes it possible to apply a controlled phase shift by means of a phase modulator to only one component of the field. Thus, the electrical voltage applied to the phase modulator changes the polarization state of the pulse (see FIGS. 4(A), 4(B)). This transmitter design allows the generation of arbitrary polarization states (the path of the change is indicated in FIG. 5), depending on the magnitude of the voltage applied to the phase modulator. For example, this scheme allows to generate of two pairs of orthogonal polarization states—the diagonal and anti-diagonal, right-circular and left-circular states to implement the BB84 quantum key distribution protocol. In this context, the operation of the key distribution protocol BB84 uses two bases—"linear" and "circular". At the output of the transmitter, laser pulses can be attenuated to a single-photon level using a variable optical attenuator. After that light propagates through the communication channel to the receiver. At the input of the receiver, the polarization controller (FIG. 1, element 8) is adjusted in such a way as to compensate for the drift of the polarization state within the communication channel. Also, the polarization controller (FIG. 1, element 8) rotates the polarization state by 90 degrees relative to the polarization state at the input of the phase modulator of the transmitter (FIG. 1, element 5). It is necessary for the linear polarization components along the axes of the lithium niobate crystal to interchange, as it allows to compensate for the effect of the polarization mode dispersion in the crystal. Next, an electrical voltage is applied to the phase modulator of the receiver to select the basis in which the polarization state measurements will be performed. For the BB84 protocol, the voltage corresponding to the phase shift is "0" or "π/2" is used. The polarization controller is then configured in such a way that the polarization state at the output of the phase modulator corresponds to one of the polarizer beam splitter own axes (for example, rotation of the linear polarization of light by 45 degrees).

Figure 2:
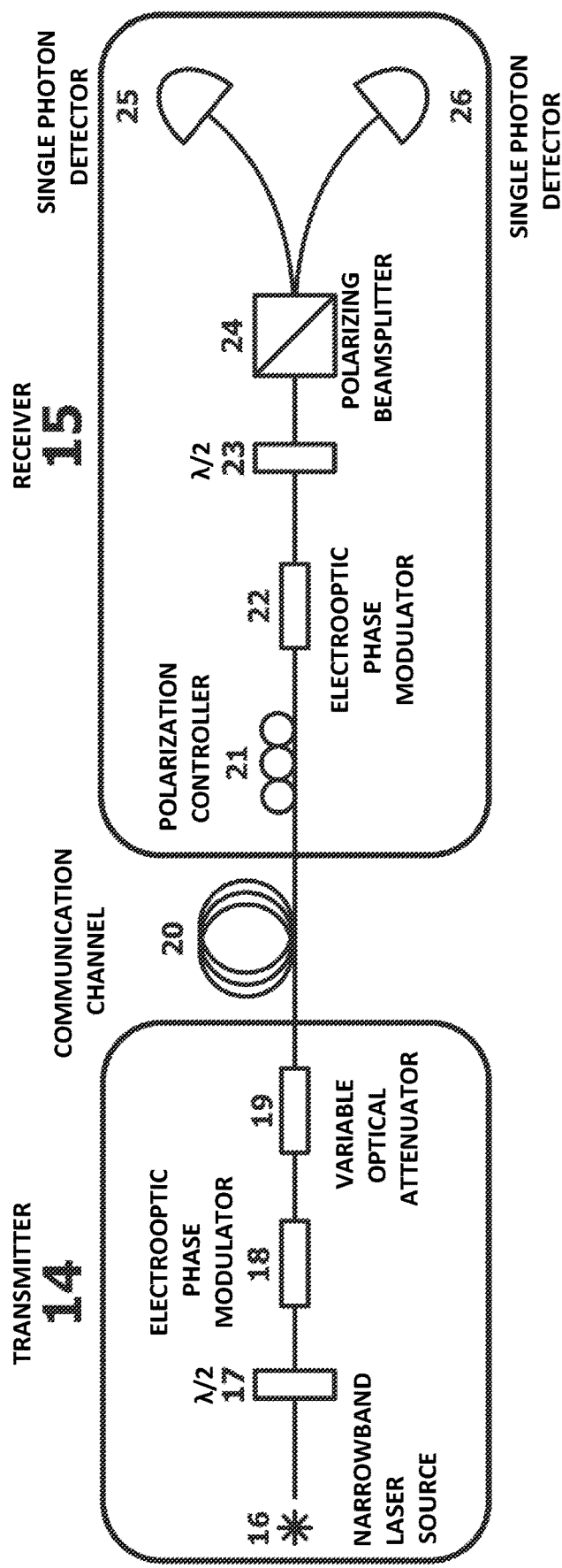
FIG. 2 illustrates another version of the optical scheme of the present invention.

FIG. 2 shows a second version of the optical scheme of the present invention. In FIG. 2, element 14 is a transmitter; element 15 is a receiver; element 16 is a narrowband laser; element 17 is a half-wave plate; element 18 is a phase-shift modulator (electro-optic phase shifter); element 19 is a variable optical attenuator; element 20 is a transmission line; element 21 is a polarization controller; element 22 is a phase-shift modulator (electro-optic phase shifter); element 23 is a half-wave plate; element 24 is a polarizing beam splitter; elements 25,26 are single-photon detectors.

This version of the optical scheme uses elements of volumetric optics and one polarization controller. The controllers (FIG. 1, elements 4, 10) were replaced by volume optics elements—half-wave plates (element 17, 23) to rotate the polarization. A fiber polarizing beam splitter (FIG. 1, element 11) is replaced by a three-dimensional polarizing beam splitter. This optical scheme involves the use of polarization-maintaining optical fiber within the receiver and transmitter devices.

The optical scheme shown in FIG. 2 is a linear fiber-optic circuit. It consists of a transmitter and a receiver, connected by an optical fiber, which is a single-mode standard telecommunication optical fiber, or an atmospheric communication channel. The transmitter consists of the following elements in order: a narrow-band laser source at a telecommunication wavelength, a half-wave plate, an electro-optical phase modulator based on lithium niobate, and an variable optical attenuator. The design of the transmitter involves the use of the polarization maintaining fiber at the input of the electro-optical phase modulator. The receiver consists of the following elements: a polarization controller, an electro-optical phase modulator based on lithium niobate, a half-wave plate, a polarizing beam splitter, and two single-photon detectors. The design of the receiver uses polarization maintaining fiber between phase modulator and the polarization beam splitter. In this scheme, half-wave plates are elements of free-space optics, it is also possible to use a free-space polarization beamsplitter.

The principle of operation of this version of the technical solution is similar to the principle of operation of option 1. The use of optical fiber that supports the polarization state in the design of the receiver and transmitter makes it possible to exclude from the circuit two polarization controllers (FIG. 1, elements 4, 10). However, in this case, the necessary rotation of the linear polarization of light (vertical or horizontal) from the laser is realized by a half-wave plate. Accordingly, on the receiver side, the half-wave plate rotates the diagonal basis into a horizontal-vertical basis, coinciding with the proper axes of the polarization beam splitter.

Figure 3:
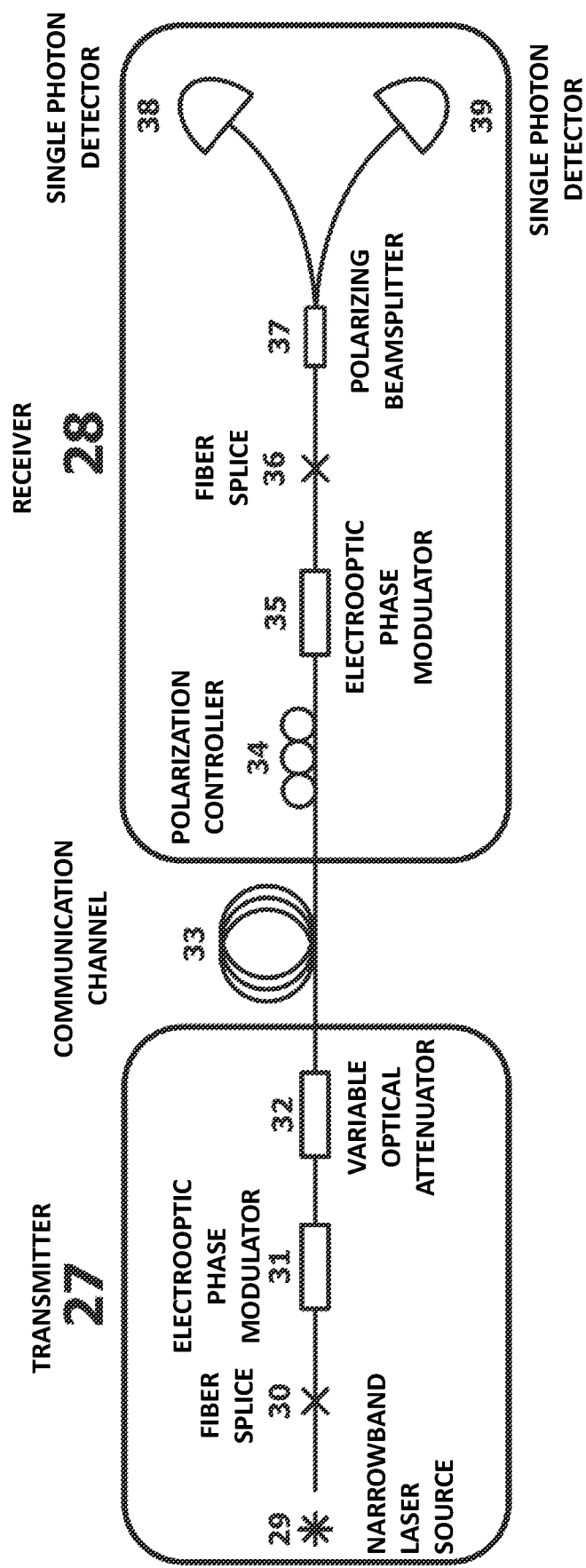
FIG. 3 illustrates yet another version of the optical scheme of the present invention.

FIG. 3 shows a third version of the optical scheme of the present invention. In FIG. 3, element 27 is a transmitter; element 28 is a receiver; element 29 is a narrowband laser; element 30 is a welding (splice) of polarization-maintaining optical fiber with a relative rotation of 45 degrees; element 31 is a phase-shift modulator (electro-optic phase shifter); element 32 is a variable optical attenuator; element 33 is a transmission line; element 34 is a polarization controller; element 35 is a phase-shift modulator (electro-optic phase shifter); element 36 is a welding (splice) of polarization-maintaining optical fiber with a relative rotation of 45 degrees; element 37 is a polarizing beam splitter; elements 38, 39 are single-photon detectors.

Thus, a fully fiber version of the optical scheme with one polarization controller (element 34) compensating for polarization drift in the communication channel is shown in FIG. 3. The controllers of FIG. 1 element. 4,10 are replaced by a special welding of polarization-maintaining optical fiber, at an angle of 45 degrees (elements 30, 36). Inside the receiver and the transmitter, an optical polarization-maintaining optical fiber is assumed.

The optical circuit shown in FIG. 3 is a linear fiber-optic circuit. It consists of a transmitter and a receiver, connected by an optical fiber, which is a single-mode standard telecommunication optical fiber, or an atmospheric communication channel. The transmitter consists of the following elements: a narrow-band laser source at the telecommunication wavelength, an electro-optical phase modulator based on lithium niobate, a variable optical modulator. The design of the transmitter involves the use of the polarization maintaining fiber at the input of the phase modulator. The receiver consists of the following elements in order—a polarization controller, an electro-optical phase modulator based on lithium niobate, a polarization controller, a polarization beam splitter, two single-photon detectors. In the receiver design, a fiber that maintains the polarization state is used to connect the phase modulator and the polarization beam splitter. For the desired rotation of the polarization state, this scheme uses the splice of polarization maintaining fiber, with 45 degrees rotation of one relative to the other.

The operating principle of this version of the technical solution is similar to the principle of the operation of version 2. In this case, the rotation of the polarization at the input of the phase modulator of the transmitter and at the output of the phase modulator of the receiver is done by means of the physical rotation of polarization maintaining fiber. The fibers are spliced with a 45 degrees rotation of the axes.

In addition, optical scheme can be equipped with:
1. Spectral filters for suppressing light at other wavelengths.
2. The amplitude-modulated electro-optical modulator at the transmitter output for the integration of the Decoy State protocol for quantum key distribution
3. Optical multiplexers FIGS. 4(A), 4(B) show transformation of the polarization state of light as a function of the phase shift applied by the phase modulator. In FIG. 4(A) the input of the phase modulator is fed with diagonal linear polarized light. Then, the polarization component of light passes through one of the optical axes of the phase modulator undergo a phase shift of 0, $\pi/2$, $\pi$ or $3\pi/2$, and accordingly the total polarization of the light at the output is transformed into right-circular polarization, antidiagonal or left-circular, respectively. FIG. 4(B) shows the case of a change in the polarization state of an optical pulse for arbitrary polarization of the input radiation (the projections of the field amplitude on the optical axes of the crystal must be equal). In this case, the polarization states corresponding to phase shifts of 0 and $\pi$ form one orthogonal basis, and the polarization states corresponding the $\pi/2$ and $3\pi/2$ phase shifts form different one.

FIG. 5 shows a trajectory of the polarization state change marked on the Poincare sphere. Pos. 40 is a trajectory of the light polarization state change, for left-circular polarization and right-circular polarization.

On the Poincare sphere, the trajectory (position 40) of a change in the state of polarization is shown with a change in the electrical voltage applied to the phase modulator, in the case that the incoming polarization state lies on the given trajectory. Polarization states that form two bases $\{\chi\}$ and $\{\psi\}$ are marked as dots on the trajectory.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A quantum key distribution device, comprising:
a transmitter, including a light source, a first polarization controller, an electrooptic phase modulator and an optical attenuator, all connected in series using a first optical fiber,
wherein the electrooptic phase modulator controls polarization of the light pulse;
a receiver, including a second polarization controller, a second phase modulator, a third polarization controller, a polarizing beamsplitter, and two single photon detectors each receiving one of two orthogonal polarizations, all connected in series using a second optical fiber; and
a communication channel providing a light path from the transmitter to the receiver,
wherein the first and third polarization controllers each uses a single half-wave plate or a splice of polarization-maintaining fiber with a non-zero mechanical rotation.

2. The quantum key distribution device of claim 1, wherein the first optical fiber is a polarization maintaining fiber.

3. The quantum key distribution device of claim 1, wherein the second optical fiber is a polarization maintaining fiber.

4. The quantum key distribution device of claim 1, wherein the electrooptic phase modulator and the second phase modulator are actively controlled non-linear optical crystals.

5. The quantum key distribution device of claim 1, wherein the electrooptic phase modulator and the second phase modulator are Pockels cell optical crystals.

6. The quantum key distribution device of claim 1, wherein the the electrooptic phase modulator and the second phase modulator are lithium niobate crystals or gallium arsenide crystals.

7. The quantum key distribution device of claim 1, wherein the first, second or third polarization controllers include any of a piezo-driven fiber compression device, a Pockels cell controller, a piezo-driven fiber twist device, and a non-linear optical crystal.

8. The quantum key distribution device of claim 1, wherein the attenuator is a variable optical attenuator.

9. The quantum key distribution device of claim 1, further comprising optical spectral filters.

10. The quantum key distribution device of claim 1, further comprising an amplitude-modulated electro-optical modulator at an output of the transmitter for integration of a Decoy State protocol for quantum key distribution.

11. The quantum key distribution device of claim 1, further comprising optical multiplexers.

* * * * *